J. N. SILVA.
NUT LOCK.
APPLICATION FILED MAY 16, 1917.

1,263,948.

Patented Apr. 23, 1918.

WITNESSES

INVENTOR
J. N. Silvia.
BY Victor J. Evans
ATTORNEY

UNITED STATES PATENT OFFICE.

JUAN N. SILVA, OF PUEBLO, COLORADO.

NUT-LOCK.

1,263,948. Specification of Letters Patent. Patented Apr. 23, 1918.

Application filed May 16, 1917. Serial No. 169,028.

*To all whom it may concern:*

Be it known that I, JUAN N. SILVA, who have declared my intention to become a citizen of the United States, residing at Pueblo, in the county of Pueblo and State of Colorado, have invented new and useful Improvements in Nut-Locks, of which the following is a specification.

This invention relates to nut locks and it consists in the novel features hereinafter described and claimed.

An object of the invention is to provide a nut lock of simple and durable structure, the parts being so arranged as to effectually hold the nuts in position upon a bolt after the same has been adjusted thereon, and the arrangement being such that the nuts may be readily detached from the bolt when desired.

With this object in view the nut lock consists in combination with a bolt a nut adapted to be screwed thereon and provided at its inner wall with a recess of peculiar configuration adapted to receive a pin which engages the thread of the bolt and prevents the nut from turning thereon.

In the accompanying drawing:—

As illustrated in the accompanying drawing, the bolt 1 is of usual configuration and is provided at one end with the usual thread 2.

Figure 1:
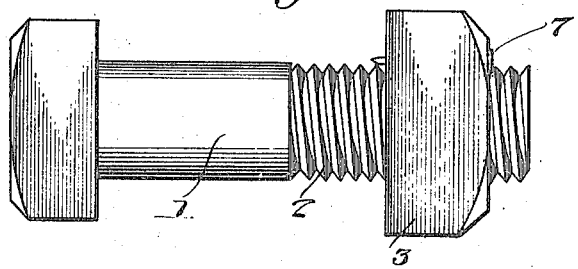
Figure 1 is a side elevation of a bolt showing the nut in position thereon and secured thereto.
Figure 2:
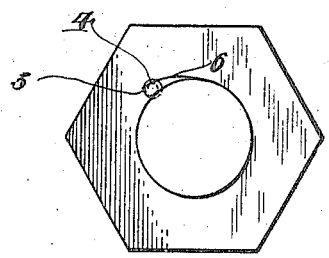
Fig. 2 is a plan view of the nut.
Figure 3:
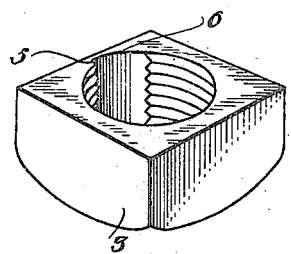
Fig. 3 is a perspective view of the nut.

The nut 3 may be of any conventional form and is provided with an internal thread adapted to engage the thread 2 of the bolt. The nut 3 is provided with a groove 4 which is located at the inner side thereof and extends completely and transversely across the same. The groove 4 is provided with one wall 5 which is disposed approximately radially with relation to the nut 3 and a second wall 6 which is concaved and disposed approximately tangentially with relation to a circle struck from the center of the nut. A pin 7 is insertible in the groove 4 and when the nut is being screwed upon the bolt the pin lies against the wall 5 of the groove 4 and inasmuch as the said wall is radially disposed with relation to the nut it carries the pin 7 around as the nut is turned so that the head of the pin 7 engages in the thread 2 of the bolt 1 as best shown in Fig. 1 of the drawing. After the nut 3 has been screwed upon the bolt 1 the pin 7 cannot be moved longitudinally away from the nut in view of the fact that the head of the pin engages in the thread 2 of the bolt. And consequently to unscrew the nut it is first necessary to remove the head from the pin 7 by using a chisel or other implement and then withdrawing the pin. This releases the nut and renders the same free to be removed from the bolt.

When the bolt 3 is in position upon the bolt 1 and the pin 7 is inserted in the groove 4 and in the event that the nut should attempt to turn upon the bolt to unscrew from the thread 2 the wall 6 of the groove 4 will encounter the side of the pin 7 and force the same into frictional contact with the thread 2 of the bolt and this will check the said turning movement of the nut.

It is apparent that should the pin 7 be inserted in the groove 4, from the inner side of the nut the head of the said pin will lie adjacent the inner side of the nut and hence is incased between the nut and the material against which the nut bears and hence the nut is permanently held in position upon the bolt.

From the foregoing description taken in conjunction with the accompanying drawing, it will be seen that a nut lock of simple and durable structure is provided and that the parts thereof may be readily manipulated to secure the nut in position upon the bolt and furthermore the parts may be easily and quickly manipulated to permit the removal of the nut from the bolt.

Having described the invention what is claimed is:—

In combination with a bolt having a thread, a nut having an internal thread adapted to engage the thread of the bolt and provided with a groove which extends transversely of its thread, the groove in the nut having one wall which lies in a plane substantially radially with relation to the nut and another wall which is disposed approximately tangentially with relation to a circle described from the center of the nut, the last mentioned wall being of greater area than the first mentioned wall and both of said walls having smooth surfaces and a pin insertible in the said groove and having at one end only a head which is engageable in the thread of the bolt and engageable with the face of the nut.

In testimony whereof I affix my signature.

JUAN N. SILVA.